US008989403B2

(12) United States Patent
Furuta et al.

(10) Patent No.: US 8,989,403 B2
(45) Date of Patent: Mar. 24, 2015

(54) NOISE SUPPRESSION DEVICE

(75) Inventors: Satoru Furuta, Tokyo (JP); Hirohisa Tasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 403 days.

(21) Appl. No.: 13/581,544

(22) PCT Filed: Mar. 9, 2010

(86) PCT No.: PCT/JP2010/001649
§ 371 (c)(1),
(2), (4) Date: Aug. 28, 2012

(87) PCT Pub. No.: WO2011/111091
PCT Pub. Date: Sep. 15, 2011

(65) Prior Publication Data
US 2013/0003987 A1 Jan. 3, 2013

(51) Int. Cl.
*H04B 15/00* (2006.01)
*G10L 21/0208* (2013.01)
*G10L 25/78* (2013.01)
*G10L 21/0216* (2013.01)
*G10L 21/0232* (2013.01)

(52) U.S. Cl.
CPC ............ *G10L 21/0208* (2013.01); *G10L 25/78* (2013.01); *G10L 2021/02163* (2013.01); *G10L 21/0232* (2013.01)
USPC .......................................................... 381/94.3

(58) Field of Classification Search
USPC .......................................................... 381/94.3
See application file for complete search history.

(56) References Cited

U.S. PATENT DOCUMENTS 6,766,292 B1 * 7/2004 Chandran et al. ............. 704/224
7,349,841 B2 3/2008 Furuta et al.
8,090,119 B2 * 1/2012 Kondo ......................... 381/94.1
2003/0014248 A1 * 1/2003 Vetter ........................... 704/226

(Continued)

FOREIGN PATENT DOCUMENTS

JP 2002 140100 5/2002
JP 2006 178333 7/2006

(Continued)

OTHER PUBLICATIONS

Office Action issued Jul. 23, 2013 in Japanese Patent Application No. 2012-504136 with partial English language translation.

(Continued)

*Primary Examiner* — Simon Sing
(74) *Attorney, Agent, or Firm* — Oblon, McClelland, Maier & Neustadt, L.L.P.

(57) ABSTRACT

A band separating unit 5 carries out a band division of a plurality of power spectra into which an input signal is converted by a time-to-frequency converting unit 2 to combine power spectra into each subband, and a band representative component generating unit 6 defines a power spectrum having a maximum among the plurality of power spectra within each subband as a representative power spectrum. A noise suppression amount generating unit 7 calculates an amount of noise suppression for each subband by using the representative power spectrum and a noise spectrum, and a noise suppressing unit 9 suppresses the amplitudes of the power spectra according to the amount of noise suppression.

7 Claims, 4 Drawing Sheets

(56) References Cited

U.S. PATENT DOCUMENTS

| | | | | |
|---|---|---|---|---|
| 2007/0156399 | A1 | 7/2007 | Matsuo | |
| 2008/0192956 | A1* | 8/2008 | Kazama | 381/94.3 |
| 2010/0010808 | A1 | 1/2010 | Sugiyama et al. | |
| 2010/0056063 | A1 | 3/2010 | Sudo | |
| 2010/0207689 | A1 | 8/2010 | Shimada | |
| 2011/0123045 | A1* | 5/2011 | Tasaki et al. | 381/94.2 |

FOREIGN PATENT DOCUMENTS

| | | |
|---|---|---|
| JP | 2007 183306 | 7/2007 |
| JP | 4172530 | 10/2008 |
| JP | 2010 55024 | 3/2010 |
| WO | WO 2009/038136 A1 | 3/2009 |

OTHER PUBLICATIONS

Extended European Search Report issued Mar. 27, 2014 in Patent Application No. 10847326.5.

Rongshan Yu, et al. "A Perceptual Model Based Speech Enhancement Algorithm", Audio Engineering Society 125$^{th}$ Convention, Convention Paper 7646, Oct. 2-5, 2008, XP 040508883, pp. 1-12.

U.S. Appl. No. 13/814,332, filed Feb. 5, 2013, Furuta, et al.

Lotter, T., "Speech Enhancement by MAP Spectral Amplitude Estimation Using a Super-Gaussian Speech Model," EURASIP Journal on Applied Signal Processing, vol. 2005, No. 7, Total 20 pages, (Jul. 2005).

Ephraim, Y., et al., "Speech Enhancement Using a Minimum Mean-Square Error Short-Time Spectral Amplitude Estimator," IEEE Transactions on Acoustics, Speech, and Signal Processing, vol. ASSP-32, No. 6, pp. 1109 to 1121, (Dec. 1984).

Zwicker, E., "Psychoacoustics," Nishimura Co., Ltd., Total 4 pages, (Aug. 1992).

Boll, S., "Suppression of Acoustic Noise in Speech Using Spectral Subtraction," IEEE Transactions on Acoustics, Speech, and Signal Processing, vol. ASSP-27, No. 2, pp. 113 to 120, (Apr. 1979).

International Search Report Issued Apr. 6, 2010 in PCT/JP10/001649 Filed Mar. 9, 2010.

* cited by examiner

FIG.2

| Subband Number z | Spectrum Number k | | Frequency Band (Hz) |
|---|---|---|---|
| | $f_1(z)$ | $f_2(z)$ | |
| 0 | 0 | 0 | 0~30 |
| 1 | 1 | 3 | 30~90 |
| 2 | 4 | 6 | 90~180 |
| 3 | 7 | 9 | 180~280 |
| 4 | 10 | 12 | 280~375 |
| 5 | 13 | 16 | 375~500 |
| 6 | 17 | 20 | 500~625 |
| 7 | 21 | 24 | 625~750 |
| 8 | 25 | 29 | 750~900 |
| 9 | 30 | 34 | 900~1050 |
| 10 | 35 | 40 | 1050~1250 |
| 11 | 41 | 47 | 1250~1470 |
| 12 | 48 | 55 | 1470~1720 |
| 13 | 56 | 64 | 1720~2000 |
| 14 | 65 | 74 | 2000~2310 |
| 15 | 75 | 86 | 2310~2680 |
| 16 | 87 | 100 | 2680~3120 |
| 17 | 101 | 118 | 3120~3690 |
| 18 | 119 | 127 | 3690~4000 |

NOISE SUPPRESSION DEVICE

FIELD OF THE INVENTION

The present invention relates to a noise suppression device which suppresses a noise carried on a voice signal.

BACKBROUND OF THE INVENTION

A noise suppression device carries out a noise suppression process of mainly inputting a signal on a time domain in which a noise is carried on a voice signal as an input signal, converting this input signal into a power spectrum which is a signal on a frequency domain, after that, estimating an average power spectrum of the noise from the power spectrum of the input signal, subtracting the estimated power spectrum of the noise from the power spectrum of the input signal to acquire the power spectrum of the input signal in which the noise is suppressed, and returning the power spectrum to the original signal on a time domain.

For example, patent reference 1 discloses such a conventional noise suppression device. The noise suppression device disclosed by patent reference 1 is based on a technique disclosed by nonpatent reference 1, calculates the average of a plurality of power spectrum components of an input signal at the time of estimation of a noise spectrum and at the time of calculation of an amount of suppression, carries out calculation of the noise spectrum and calculation of an amount of suppression from the single average acquired thereby, and applies the noise spectrum and the amount of suppression to the plurality of power spectrum components.

RELATED ART DOCUMENT

Patent Reference

Patent reference 1: Japanese Patent No. 4172530 (pp. 8-12 and FIG. 2)

Nonpatent Reference

Nonpatent reference 1: Y. Ephraim, D. Malah, "Speech Enhancement Using a Minimum Mean-Square Error Short-Time Spectral Amplitude Estimator", IEEE Trans. ASSP, Vol. 32, No. 6, pp. 1109-1121, December 1984

SUMMARY OF THE INVENTION

Because conventional noise suppression devices are constructed as above, there arises a problem which will be mentioned below.

A conventional noise suppression device needs to carry out a complicated calculation, such as a calculation of a Bessel function for each power spectrum component of the input signal, in performing the amount of suppression for noise suppression, and therefore has a large amount of information to be processed. To solve this problem, the conventional noise suppression device disclosed by patent reference 1 averages the plurality of spectral components collectively, and calculates the averaged spectral component as a representative spectrum component of each spectral component, thereby reducing the amount of information to be processed. A problem with this method is, however, that even if a component having a large amplitude exists in the spectral components (i.e. a component which can be assumed to be a voice component), the voice component is underestimated by averaging the spectral components, and, as a result, the voice signal is suppressed and the suppression of the voice increases, so that the voice degrades in its quality.

The present invention is made in order to solve this problem, and it is therefore an object of the present invention to provide a noise suppression device which can carry out a high-quality noise suppression with a small amount of information to be processed.

In accordance with the present invention, there is provided a noise suppression device including a representative component generating unit for combining a plurality of power spectra into which an input signal is converted by a time-to-frequency converting unit into each group, and for selecting a power spectrum having a larger value from among the plurality of power spectra in each group on a priority basis to define the power spectrum selected thereby as a representative power spectrum, in which a noise suppression amount generating unit calculates an amount of noise suppression by using the representative power spectrum.

Therefore, because the noise suppression device according to the present invention calculates the amount of noise suppression by using the representative power spectrum, the noise suppression device can reduce the amount of information to be processed. Further, because the noise suppression device uses the power spectrum having a larger value in each group as this representative power spectrum, the noise suppression device prevents a voice component of the input signal from being underestimated at the time of the calculation of the amount of noise suppression. As a result, the noise suppression device does not suppress the voice signal, but can carry out a high-quality noise suppression.

BRIEF DESCRIPTION OF THE FIGURES

FIG. 2 is a graph showing an example of a band division of a power spectrum by a band separating unit;

EMBODIMENTS OF THE INVENTION

Hereafter, in order to explain this invention in greater detail, the preferred embodiments of the present invention will be described with reference to the accompanying drawings.

Embodiment 1

Figure 1:
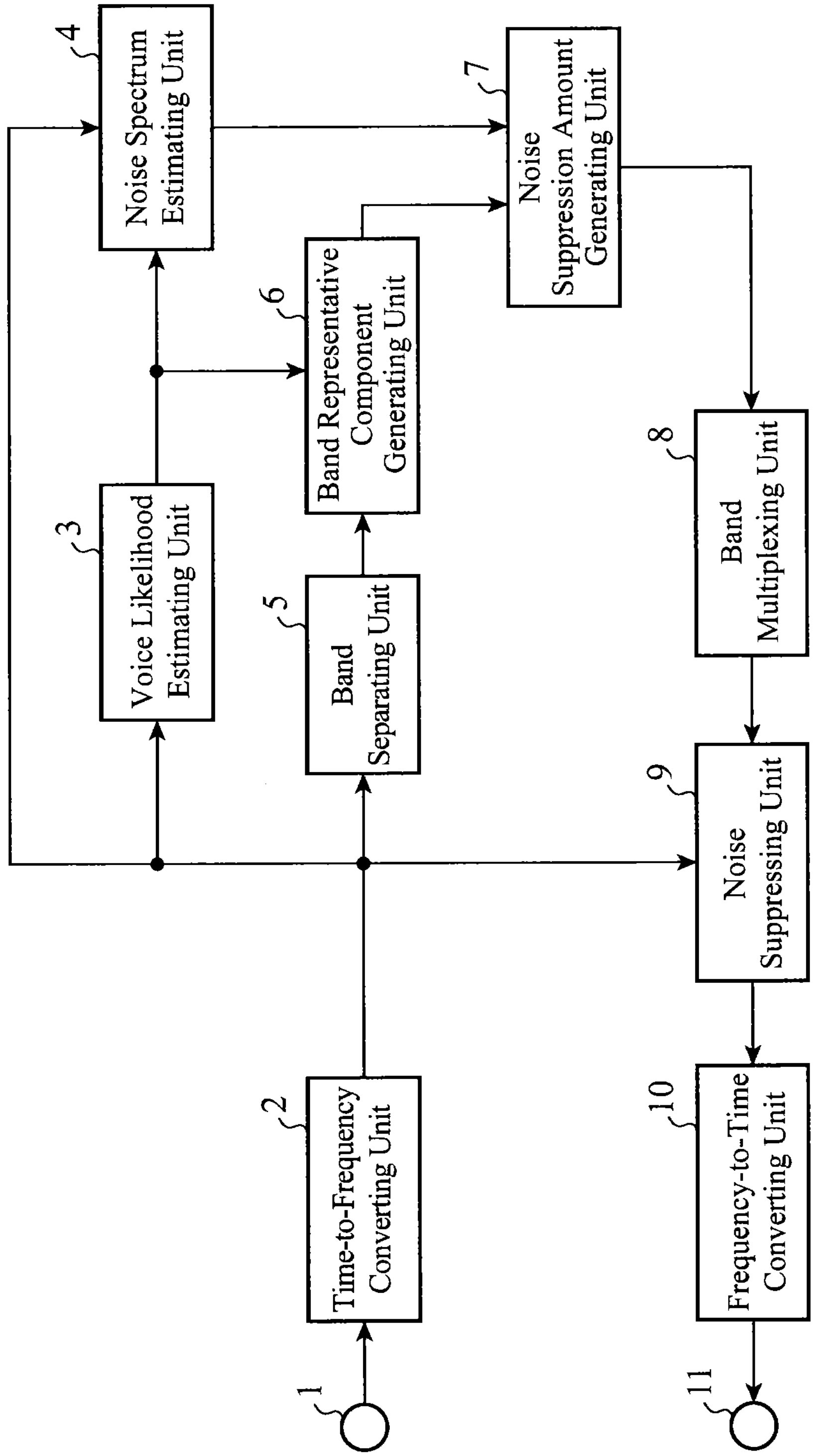
FIG. 1 is a block diagram showing the structure of a noise suppression device in accordance with Embodiment 1 of the present invention.

A noise suppression device shown in FIG. 1 is provided with an input terminal 1, a time-to-frequency converter 2, a voice likelihood estimating unit 3, a noise spectrum estimating unit 4, a band separating unit 5, a band representative component generating unit (representative component generating unit) 6, a noise suppression amount generating unit 7, a band multiple copying unit 8, a noise suppressing unit 9, a frequency-to-time converting unit 10, and an output terminal 11.

As an input of this noise suppression device, a signal which is sampled at a predetermined sampling frequency (e.g. 8 kHz) and is divided into frames (each having a duration of 10 ms, for example) after the input is acquired by A/D (analog-to-digital) converting a voice, a musical piece or the like which is captured by way of a microphone (not shown) or the like.

Hereafter, a principle behind the operation of the noise suppression device in accordance with Embodiment 1 will be explained with reference to FIG. 1. The input terminal 1 accepts such a signal as mentioned above and outputs this signal to the time-to-frequency converting unit 2 as an input signal y(t).

The time-to-frequency converting unit 2 carries out a process of windowing the input signal y(t) which is divided into frames, and converts the windowed signal y(n, t) on a time axis into a signal (spectrum) on a frequency axis by using, for example, an FFT (Fast Fourier Transform) with 256 points to calculate a power spectrum Y(n, k) and a phase spectrum P(n, k) of the input signal, where n shows a frame number, k shows a spectrum number, and t shows a discrete time number. Hereafter, the input signal is the one of the current frame unless otherwise specified, and the frame number will be omitted when the signal shows a spectrum.

The acquired power spectra are outputted to the voice likelihood estimating unit 3, the noise spectrum estimating unit 4, the band separating unit 5, and the noise suppressing unit 9. Further, the acquired phase spectra are outputted to the frequency-to-time converting unit 10. As the windowing process, a known method, such as a Hanning window or a trapezoidal window, can be used. Further, when carrying out the windowing process, the time-to-frequency converting unit 2 also carries out a zero filling process as needed. Because the FFT is a well-known method, the explanation of this method will be omitted hereafter.

The voice likelihood estimating unit 3 uses the power spectra of the input signal inputted thereto from the time-to-frequency converting unit 2 to calculate, as a degree of "likelihood that the input signal of the current frame is a voice", a voice likelihood estimated value which has a large value when there is a high likelihood that the input signal is a voice, or has a small value otherwise.

As a method of calculating the voice likelihood estimated value, for example, any one of known methods including a maximum of autocorrelation coefficients acquired by performing a Fourier transform on the power spectra of the input signal, input signal energy acquired from the total sum of the power spectra, an all-band SN ratio (signal to noise ratio) of the input signal, and spectrum entropy showing variations in the power spectra can be used independently, or a combination of some of them can be used. In this embodiment, for the sake of simplicity, a case in which the maximum of the autocorrelation coefficients which can be calculated from the power spectra of the input signal of the current frame is used independently will be shown below. The autocorrelation coefficients c(i) can be calculated as shown by the following equation (1).

$$c(\tau)=F[Y(n,k)] \tag{1}$$

where τ is a lag (delay time) and F[] show a Fourier transform. As this Fourier transform, for example, an FFT with 256 points which is the same as that used by the time-to-frequency converting unit 2 can be used. Because a method of calculating the autocorrelation coefficients according to the above-mentioned equation (1) is well known, the explanation of the method will be omitted hereafter.

The voice likelihood estimating unit 3 then normalizes the acquired autocorrelation coefficients c(τ) so that each of them has a value ranging from 0 to 1 by dividing each of the autocorrelation coefficients by c(0), searches for a maximum of the autocorrelation coefficient in a range of, for example, 16<τ<120 where there is a high possibility that a voice fundamental frequency exists, and outputs the maximum acquired thereby to the noise spectrum estimating unit 4 as a voice likelihood estimated value VAD.

The noise spectrum estimating unit 4 estimates an average noise spectrum included in the input signal by using both the power spectrum Y(k) of the input signal, and the voice likelihood estimated value VAD. More specifically, the noise spectrum estimating unit 4 refers to the voice likelihood estimated value VAD which is the output of the voice likelihood estimating unit 3, and, when there is a high likelihood that the input signal of the current frame is a noise (i.e. when there is a low likelihood that the input signal of the current frame is a voice), and updates the noise spectrum N(n−1, k) of the immediately preceding frame which the noise spectrum estimating unit 4 has stored by using the power spectrum Y(n, k) of the input signal of the current frame and outputs the noise spectrum updated thereby to the noise suppression amount generating unit 7.

For example, the noise spectrum estimating unit 4 carries out the update of the noise spectrum by reflecting the power spectrum of the input signal in the noise spectrum according to an equation (2) shown below when the voice likelihood estimated value VAD is equal to or smaller than a predetermined threshold (e.g. 0.2). Because it can be considered that there is a high likelihood that the input signal of the current frame is a voice when the voice likelihood estimated value VAD exceeds the threshold of 0.2, the noise spectrum estimating unit does not carry out the update of the noise spectrum, but uses the noise spectrum of the immediately preceding frame as the noise spectrum of the current frame just as it is.

$$\begin{cases} \tilde{N}(n,k) = (1-\alpha(k))\cdot N(n-1,k) + \alpha(k)\cdot Y(n,k), & VAD \le 0.2 \\ \tilde{N}(n,k) = N(n-1,k), & VAD > 0.2 \end{cases} \tag{2}$$

where n is the frame number, k is the spectrum number, K is the value which is half of the number of FFT points, N(n−1, k) is the noise spectrum yet to be updated, Y(n, k) is the noise spectrum of the current frame which is determined to have a high likelihood of being a noise, and N(n, k) is the noise spectrum updated. Although "" (tilde symbol) in the above equation (2) is shown by "" because this application is an electronic patent application, the tilde symbol of the noise spectrum updated will be omitted in the subsequent explanation. Further, α(k) is a predetermined update rate coefficient having a value ranging from 0 to 1, and can be set to a value relatively close to 0. However, because there is a case in which it is better to increase the update rate coefficient as the frequency becomes high, it is also possible to adjust the update rate coefficient properly according to the type of noise, or the like.

The noise spectrum estimating unit 4 further stores the noise spectrum N(n, k) of the current frame in order to use this noise spectrum in the next update process. As a storage unit, a storage unit which is represented by, for example, a semiconductor memory, a hard disk, or the like, and from and in which data can be read and written electrically or magnetically at any time is used.

The band separating unit 5 divides the power spectrum Y(k) of the input signal into non-uniform frequency bands to group the power spectrum into subband spectra. An example of the division of the band of the power spectrum Y(k) of the input signal is shown in FIG. 2. In the example of FIG. 2, the band separating unit divides the low-to-high band range of the power spectrum Y(k) of the input signal into 19 non-uniform frequency bands, and defines each group as a subband. Concretely, k=35th to 40th spectral components belong to a subband having a subband number z=10. The subbands shown in FIG. 2 are called critical bands, and have a high degree of consistency with human being's aural characteristics. The unit of the subband numbers of these critical bands is Bark. Refer to "Psychoacoustics" written by E. Zwicker (Nishimura Co., Ltd., August, 1992) for more information on the details of the critical bands.

Although FIG. 2 shows the example in which the band separating unit 5 divides the power spectrum into non-uniform frequency subbands existing in the critical bands, the present embodiment is not limited to this example. For example, the band separating unit can carry out division into octave bands whose bandwidths become narrower by a factor of 2 as their frequencies decrease. The band separating unit can alternatively carry out division into equal size subbands by which all of the band of the power spectrum is divided into equal size subbands each of which consists of four spectral components. As an alternative, in order to improve the accuracy for a specific frequency band (a low frequency band, a fundamental frequency band which is a significant part of a voice, or a band where there is a high possibility that a formant component is distributed), the band separating unit can carry out division into finer bands, thereby being able to suppress the degradation of the noise suppression characteristics which will be mentioned below. The band separating unit 5 outputs the power spectrum Y(z, k) of the subband number z of each of the subbands into which the band of the power spectrum is grouped to the band representative component generating unit 6 after carrying out the dividing process in the above-mentioned way.

The band representative component generating unit 6 generates a representative power spectrum $Y_d(z)$ representing each subband by using the power spectrum Y(z,k) of each subband inputted thereto from the band separating unit 5, and outputs the representative power spectrum to the noise suppression amount generating unit 7. As a method of generating the representative power spectrum $Y_d(z)$, for example, there is a method, as shown in an equation (3) mentioned below, of sequentially comparing the size of the power spectrum Y(k) with that of another power spectrum within each subband, and defining the power spectrum Y(k) having the largest value as the representative power spectrum $Y_d(z)$. However, when the voice likelihood estimated value VAD outputted from the voice likelihood estimating unit 3 is equal to or smaller than a predetermined threshold (e.g. 0.2), instead of the method of selecting the power spectrum Y(k) having the largest value as the representative power spectrum $Y_d(z)$, for example, a method, as shown in patent reference 1, of calculating the average of all the power spectra Y(k) within each subband and defining the average as the representative power spectrum $Y_d(z)$ is used.

$$Y_d(z) = \begin{cases} \max\left[Y(z,k)\big|_{k=f_1(z)}^{k=f_2(z)}\right], & VAD > 0.2 \\ \sum_{k=f_1(z)}^{f_2(z)} \frac{Y(z,k)}{(f_2(z) - f_1(z) + 1)}, & VAD \le 0.2 \end{cases} \quad (3)$$

where z=0, . . . , 18.

Figure 3:
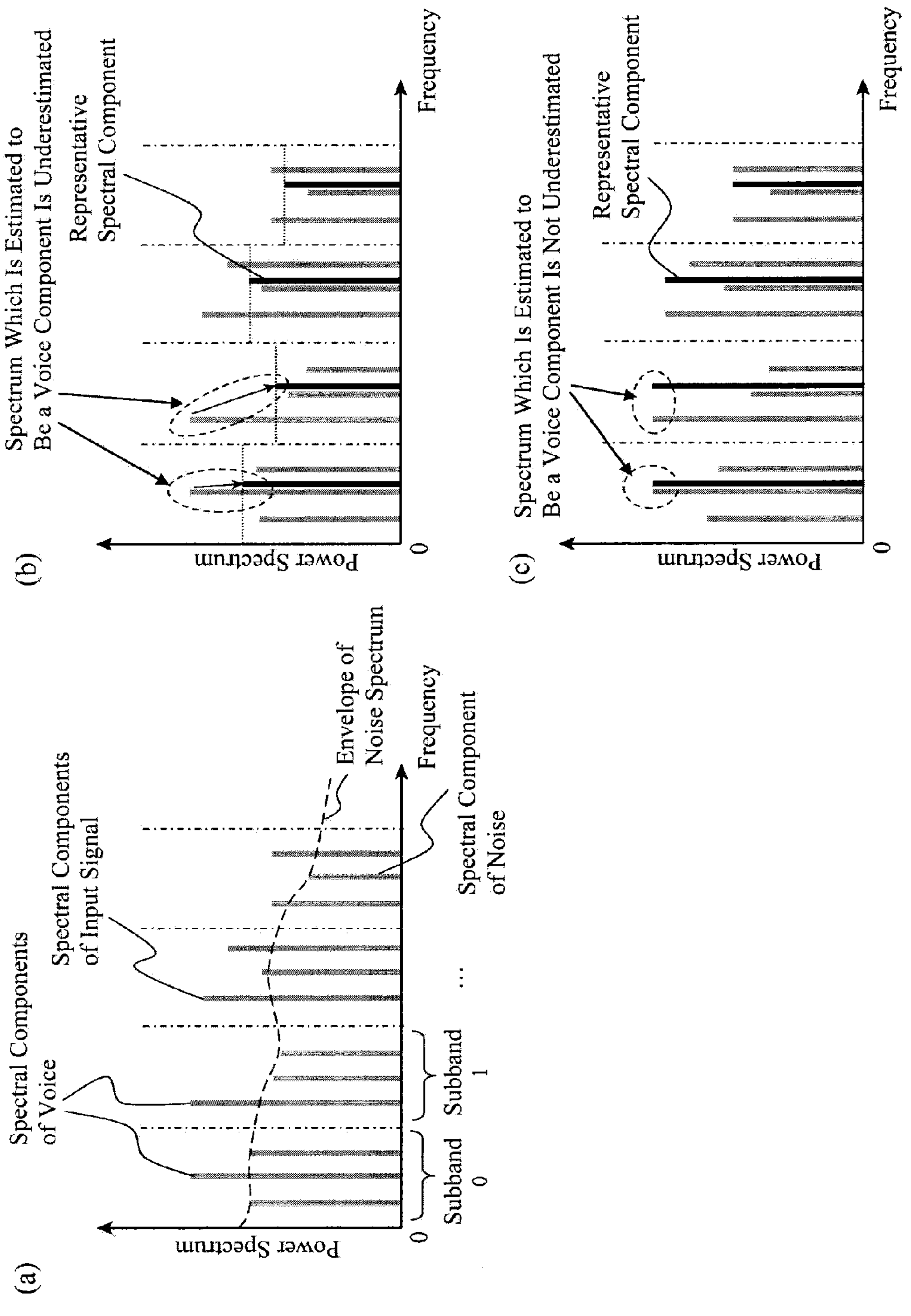
FIG. 3 is a view schematically showing a process carried out and an effect provided by a band representative component generating unit, FIG. 3(*a*) is a graph of the power spectra of an input signal, FIG. 3(*b*) is a view schematically showing a process carried out and an effect provided by a band representative component generating unit when the average of the power spectra within each subband is defined as a representative power spectrum (conventional method), FIG. 3(*c*) is a view schematically showing a process carried out and an effect provided by a band representative component generating unit when a maximum of the power spectra within each subband is defined as the representative power spectrum (present invention)

FIG. 3 is a view schematically showing the process carried out and an effect provided by the band representative component generating unit 6 according to this Embodiment 1.FIG. 3(*a*) is a graph in which the power spectra of the input signal at a certain time in which a noise is mixed are plotted. In this figure, the vertical axis shows the size (amplitude) of each power spectrum and the horizontal axis shows the frequency. Further, each solid line is a power spectrum component of the input signal, a dashed line shows the envelope of the noise spectrum, and each dashed dotted line shows a boundary between subbands. In addition, in order to simplify the view, an example in which the frequency band is divided equal size subbands is shown.

FIG. 3(*b*) shows results which are acquired in a case of calculating the average of the power spectra in each subband from the input signal shown in FIG. 3(*a*) by using a conventional method, and defining the average as the representative power spectrum. According to this method, because the size of a power spectrum which is estimated to be a voice component becomes small, the voice component is underestimated by the noise suppression amount generating unit 7 which will be mentioned below, and, as a result, the voice signal is suppressed and the suppression of the voice increases, so that the voice degrades in its quality.

In contrast, FIG. 3(*c*) shows results which are acquired when the band representative component generating unit 6 calculates a representative power spectrum from the input signal shown in FIG. 3(*a*). Because a voice signal exists in the input signal in the example of FIG. 3, the voice likelihood estimated value VAD is sufficiently larger than the threshold of 0.2. Therefore, the band representative component generating unit 6 determines the representative power spectrum according to the above-mentioned equation (3). It can be seen from FIG. 3(*c*) that as compared with the conventional method shown in FIG. 3(*b*), the power spectrum which is estimated to be a voice component is stored, the voice component is not underestimated by the next-stage noise suppression amount generating unit 7, and the voice signal is not suppressed. Therefore, a high-quality noise suppression can be implemented. Although the case in which the frequency band is divided equal size subbands is illustrated in FIG. 3, it is needless to say that the same advantage is provided even in a case in the frequency band is divided into non-equal size bands having, for example, critical bandwidths as shown in the table of FIG. 2.

Although the case in which the voice likelihood estimated value VAD is large and a voice signal exists in the input signal is illustrated in FIG. 3, the noise suppression device can switch to the conventional calculating method using the average to generate the representative power spectrum because in another case in which, for example, the voice likelihood estimated value VAD is small and there is a high likelihood that the input signal of the current frame is a noise, there is a high likelihood that even if a power spectrum having a large value exists, the input signal is a noise. Because the noise suppression device can reduce the amplitude of a power spectrum of having a large value which has a high likelihood of being a noise by calculating the average of the power spectra within each subband, the noise suppression device can suppress generation of an erroneous representative power spectrum.

When there is little influence of noise, such as when the noise carried on the input signal is small, the band representative component generating unit 6 can always select a method of using, as the representative power spectrum, a power spectrum having a maximum, instead of switching to the method of calculating the representative power spectrum according to the voice likelihood estimated value VAD.

The noise suppression amount generating unit 7 generates an amount G(z) of noise suppression for each subband by using both the representative power spectrum $Y_d(z)$ inputted thereto from the band representative component generating unit 6, and the noise spectrum N(n, k) inputted thereto from the noise spectrum estimating unit 4 according to a predetermined computing equation which is prepared in advance, and outputs the amount G(z) of noise suppression to the band multiple copying unit 8. A method of deriving the computing equation for calculating this amount G(z) of noise suppression will be mentioned later.

The band multiple copying unit 8 generates multiple copies of the amount G(z) of noise suppression for each subband which the noise suppression amount generating unit 7 has acquired for the spectrums belonging to each subband, respectively, to define one of the multiple copies as an amount G(k) of noise suppression for each of the spectrums. More specifically, the band multiple copying unit spreads the amount G(z) of noise suppression for each subband by copying the value of the amount G(z) of noise suppression having a subband number z to the value of the amount G(k) of noise suppression having each spectrum number k belonging to the same subband number z. The noise suppression amount generating unit 7 outputs the amount G(k) of noise suppression for each spectrum acquired thereby to the noise suppressing unit 9.

The noise suppressing unit 9 generates the power spectrum Y^(k) of the input signal on which a noise suppression has been carried out by using both the power spectrum Y(k) of the input signal inputted thereto from the time-to-frequency converting unit 2, and the amount G(k) of noise suppression for each spectrum inputted thereto from the noise suppression amount generating unit 7 according to an equation (4) shown below, and outputs the power spectrum Y^(k) of the input signal to the frequency-to-time converting unit 10. "^" (hat symbol) in the above equation (4) is shown by "^" because this application is an electronic patent application, and the hat symbol will also be shown by "^" in equations shown below.

$$\hat{Y}(k)=G(k)\cdot Y(k) \quad (4)$$

where k=0, . . . , K, and K is a value which is half of the number of FFT points.

The frequency-to-time converting unit 10 converts the spectrum on a frequency domain into a signal on a time domain by performing a reverse fast Fourier transform (reverse FFT) on the spectrum by using both the power spectrum Y^(k) of the input signal which is inputted thereto from the noise suppressing unit 9 and on which the noise suppression has been carried out, and the phase spectrum P(k) inputted thereto from the time-to-frequency converting unit 2, and, after carrying out an overlapping process of overlapping the signal on a time domain and the signal of the immediately preceding frame which is stored in the frequency-to-time converting unit 10 to generate a signal, outputting this signal to the output terminal 11 as an input signal y^(t) on which the noise suppression has been carried out. The output terminal 11 outputs this input signal y^(t) on which the noise suppression has been carried out.

Figure 4:
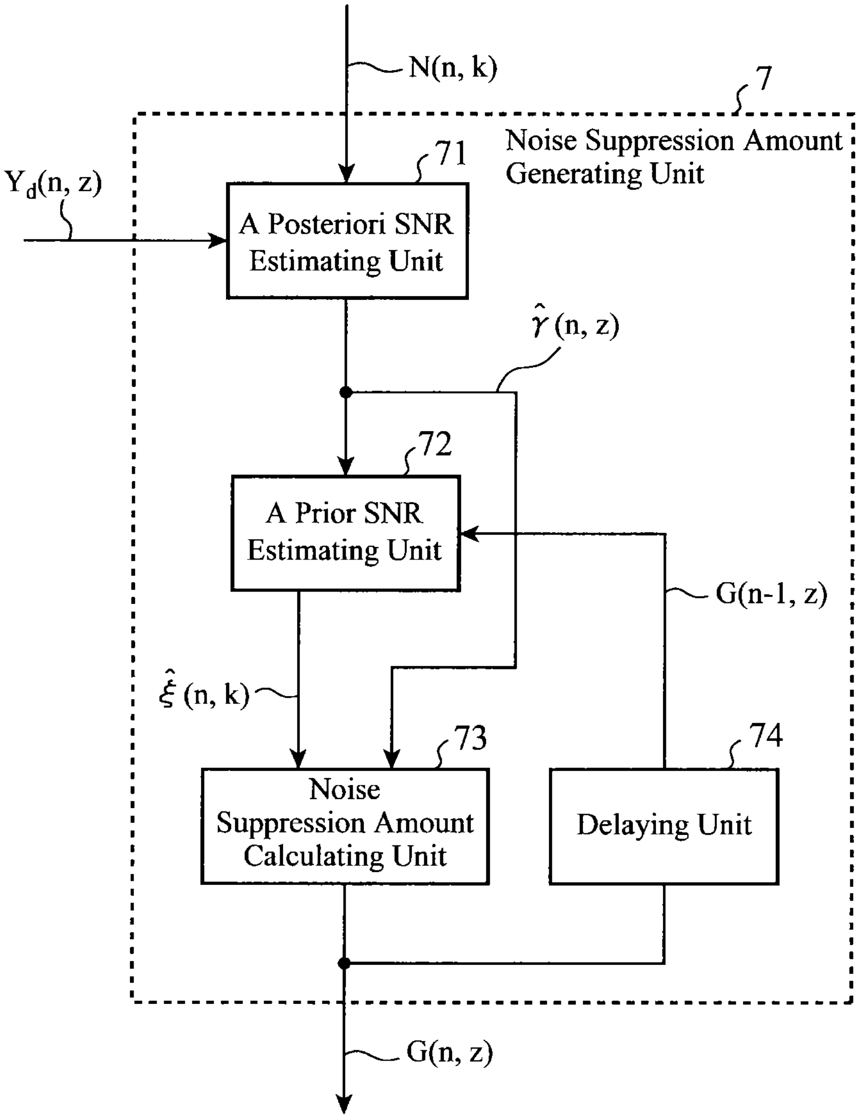
FIG. 4 is a block diagram showing the details of the structure of a noise suppression amount generating unit.

Next, a calculating method which the noise suppression amount generating unit 7 uses will be explained with reference to FIG. 4. The noise suppression amount generating unit 7 shown in FIG. 4 is provided with a a posteriori SNR (signal to noise ratio) estimating unit 71, a a prior SNR estimating unit 72, a noise suppression amount calculating unit 73, and a delaying unit 74. Hereafter, the method of calculating the amount of noise suppression will be explained on the basis of a calculating method (Maximum A Posteriori; MAP method) described in "Speech Enhancement by MAP Spectral Amplitude Estimation Using a Super-Gaussian Speech Model", T. Lotter, P. Vary, (EURASIP Journal on Applied Signal Processing, Vol. 2005, No. 7, pp. 1110-1126, July 2005).

The a posteriori SNR estimating unit 71 estimates a a posteriori SNRγγ^(n, z) for each subband according to an equation (5) shown below by using both the representative power spectrum $Y_d(z)$ inputted from the band representative component generating unit 6, and the noise spectrum N(k) inputted from the noise spectrum estimating unit 4. At this time, the noise spectrum N(z) is an average for each subband which is determined according to, for example, an equation (6) shown below in order to bring the noise spectrum into correspondence with the subband.

$$\hat{\gamma}(n,z)=\frac{Y_d(n,z)}{N(n,z)} \quad (5)$$

where z=0, . . . , 18.

$$N(z)=\sum_{k=f_1(z)}^{f_2(z)}\frac{N(z,k)}{(f_2(z)-f_1(z)+1)} \quad (6)$$

where z=0, . . . , 18.

The a prior SNR estimating unit 72 recursively estimates a a prior SNR ξ(n, k) according to an equation (7) shown below by using the a posteriori SNR γ^(n, z) for each subband which is inputted thereto from the a posteriori SNR estimating unit 71, and the amount G(n−1, z) of noise suppression of the immediately preceding frame which is acquired by the delaying unit 74 which will be mentioned later. The a prior SNR estimating unit 72 stores the a posteriori SNR γ^(n−1, z) of the preceding frame in the storage unit, such as an internal memory, and uses the a posteriori SNR for calculations for the current frame.

$$\hat{\xi}(n,z)=\alpha\cdot\hat{\gamma}(n-1,z)\cdot G^2(n-1,z)+(1-\alpha)\cdot F[\hat{\gamma}(n,z)-1] \quad (7)$$

$$\text{where } F[x]=\begin{cases}x, & x>0\\ 0, & \text{else}\end{cases}$$

In this case, although α is a predetermined oblivion coefficient having a value of 0<α<1 and α=0.98 can be selected as a proper value, α can be alternatively adjusted properly according to the voice inputted and an aspect of noise.

The noise suppression amount calculating unit 73 calculates the amount G(z, n) of noise suppression for each subband according to an equation (8) shown below by using both the a prior SNR ξ^(n, z) inputted thereto from the a prior SNR estimating unit 72, and the a posteriori SNR γ^(n, z) inputted thereto from the a posteriori SNR estimating unit 71, and outputs the amount G(z, n) of noise suppression to the band multiple copying unit 8, and also outputs the amount G(z, n) of noise suppression to the delaying unit 74.

$$G(n,z)=u+\sqrt{u^2+\frac{v}{2\hat{\gamma}(n,z)}} \tag{8}$$

$$\text{where } u=\frac{1}{2}-\frac{\mu}{4\sqrt{\hat{\gamma}(n,z)\cdot\overleftarrow{\xi}(n,z)}}$$

In this case, v and p are predetermined coefficients, and v=0.126 and μ=1.74 are shown as preferable values in the reference about the above-mentioned maximum a posteriori method. It is needless to say that v and p can have values other than these values, and can be adjusted properly according to the input signal and an aspect of noise.

The delaying unit 74 holds the amount G(n−1,z) of noise suppression for each subband of the immediately preceding frame outputted from the noise suppression amount calculating unit 73 which will be mentioned below therein, and sends out the amount G(n−1,z) of noise suppression to the a prior SNR estimating unit 72 so that the amount G(n−1,z) of noise suppression can be applied to the calculation for the current frame based on the above equation (7).

As mentioned above, the noise suppression device according to this Embodiment 1 is constructed in such a way as to include: the time-to-frequency converting unit 2 for converting an input signal on a time domain inputted thereto from the input terminal 1 into power spectra and phase spectra which are signals on a frequency domain; the noise spectrum estimating unit 4 for estimating a noise spectrum carried on the input signal; the band separating unit 5 for combining a plurality of power spectra into which the input signal is converted by the time-to-frequency converting unit 2 into each subband; the band representative component generating unit 6 for defining a power spectrum having a maximum value among the plurality of power spectra within each subband as a representative power spectrum; the noise suppression amount generating unit 7 for calculating an amount of noise suppression for each subband by using the representative power spectrum and the noise spectrum; the band multiple copying unit 8 for converting the amount of noise suppression for each subband into an amount of noise suppression for each spectrum; the noise suppressing unit 9 for suppressing the amplitude of the power spectrum according to the amount of noise suppression for each spectrum; and the frequency-to-time converting unit 10 for converting the phase spectra and the power spectra whose amplitudes are suppressed by the noise suppressing unit 9 into signals on a time domain, and outputs these signals from the output terminal 11. Therefore, because the noise suppression device calculates the amount of noise suppression by using the representative power spectrum, the noise suppression device can reduce the amount of information to be processed. Further, because the noise suppression device uses the power spectrum having a larger value within each group as this representative power spectrum, the noise suppression device prevents a voice component of the input signal from being underestimated at the time of the calculation of the amount of noise suppression. As a result, the noise suppression device does not suppress the voice signal, but can carry out a high-quality noise suppression.

The noise suppression device according to this Embodiment 1 further includes the voice likelihood estimating unit 3 for calculating a voice likelihood estimated value showing the degree of likelihood that the input signal is a voice, and the band representative component generating unit 6 is constructed in such a way as to define a power spectrum having a maximum within each subband as the representative power spectrum on the basis of the voice likelihood estimated value when the degree of likelihood that the input signal is a voice is high, and calculate the average of the plurality of power spectra within each subband to generate the representative power spectrum when the degree of likelihood that the input signal is a voice is low. Therefore, the noise suppression device can suppress the generation of an erroneous representative power spectrum, and can carry out a high-quality noise suppression.

Although the noise suppression device according to above-mentioned Embodiment 1 is constructed in such a way that the a posteriori SNR estimating unit 71 calculates the average by using the equation (6) in order to bring the noise spectrum into correspondence with each subband, this embodiment is not limited to this example. For example, the noise suppression device can be constructed in such a way as to bring the noise spectrum N(k) corresponding to the spectrum number k of the power spectrum Y(k) having the largest value which the noise suppression device has selected when generating the representative power spectrum $Y_d(z)$ into correspondence with each subband. In this structure, particularly when the bandwidths of the subbands divided are narrow, the accuracy of the estimation of the a posteriori SNR can be improved, and the noise suppression device can therefore carry out a higher-quality noise suppression.

Further, the noise suppression device according to above-mentioned Embodiment 1 is constructed in such a way that the band multiple copying unit 8 spreads the amount G(z) of noise suppression for each subband by copying the value of the amount G(z) of noise suppression for each subband to the value of the amount G(k) of noise suppression for each spectrum belonging to the same subband. The present embodiment is not limited to this example. For example, the band multiple copying unit can determine a weighted average as shown by an equation (9) shown below by using the amounts G(z−1) and G(z+1) of noise suppression of the subbands adjacent to each subband.

$$G(z,k)\Big|_{k=f_1(z)}^{f_2(z)}=\frac{(L-k)\cdot G(z-1)}{4L}+\frac{G(z)}{2}+\frac{k\cdot G(z+1)}{4L} \tag{9}$$

The value of the left side which is calculated in this equation (9) means the amount G(k) of noise suppression for each spectrum belonging to the subband number z, and shows that the spectrum number k varies from f1(z) to f2(z) in the table shown in FIG. 2. Further, the right side of the equation means that a weight of 0.5 is assigned to the component having a subband number z, and a weight of 0.25 is assigned to the components respectively having subband numbers z−1 and z+1 which are adjacent to the subband number z. The right side further shows that the weight varies continuously with the change in the spectrum number k from f1(z) to f2(z). In the above equation, L shows the number of the spectrum numbers k belonging to the subband number z. By determining the weighted average in this way, the noise suppression device can stabilize the change in a direction of the frequency of the amount G(k) of noise suppression particularly when the bandwidths of the subbands divided are wide, and the noise suppression device can carry out a higher-quality noise suppression.

Further, although the band representative component generating unit 6 in accordance with above-mentioned Embodiment 1 selects the power spectrum having the largest value when generating the representative power spectrum, the present embodiment is not limited to this example. For example, assuming that the power spectrum having the largest value exists in the vicinity of a boundary of each subband, the band representative component generating unit can select a power spectrum belonging to a frequency close to the center of each subband and having the second largest value on a priority basis. As an alternative, the band representative component generating unit can end the search for a power spectrum using the above-mentioned equation (3) when detecting a power spectrum whose value exceeds the predetermined threshold to define the power spectrum as the representative power spectrum. Because the band representative component generating unit selects a power spectrum belonging to a frequency close to the center of each subband on a priority basis, there is provided an advantage of improving the accuracy of the estimation of the a posteriori SNR when the bandwidths of the subbands divided are wide. Because the band representative component generating unit ends the search for a power spectrum when detecting a power spectrum whose value exceeds the predetermined threshold, there is provided an advantage of being able to reduce the amount of information to be processed which is required to make a search for the representative power spectrum.

Further, although the voice likelihood estimating unit 3 according to this Embodiment 1 is constructed in such a way as to use the maximum of the autocorrelation coefficients of the input signal as the voice likelihood estimated value, the present embodiment is not limited to this example. For example, the voice likelihood estimating unit can be constructed in such a way as to use linear prediction residual power or the like which is a result of analyzing the input signal on a time domain in combination with the known method, such as spectrum entropy above mentioned.

Embodiment 2

Although in the noise suppression device according to above-mentioned Embodiment 1 the band representative component generating unit 6 selects a power spectrum having the largest value within the same subband as the representative power spectrum, the noise suppression device can alternatively use another selecting method. For example, the noise suppression device can sort the power spectra within the same subband in descending order of their values, assigns different weights to the power spectra, respectively, the weights sequentially increasing with increase in the values of the power spectra, to determine a weighted average of the power spectra, and define the weighted average value as the representative power spectrum. As an alternative, the noise suppression device can use a statistical method, such as a median, to define a median as the representative power spectrum.

As mentioned above, the band representative component generating unit 6 according to this Embodiment 2 is constructed in such a way as to assign different weights to the plurality of power spectra in each subband, respectively, the weights sequentially increasing with increase in the values of the power spectra, to determine a weighted average of the plurality of power spectra, and define the weighted average as the representative power spectrum. Therefore, when a high-amplitude noise occurs and this causes a reduction in the accuracy of analysis of the voice likelihood estimated value, and when it is difficult to make a distinction between a voice component and a noise component, the noise suppression device can generate the representative power spectrum with stability and can therefore carry out a high-quality noise suppression. Further, even the use of a statistical method, such as a median, instead of the weighted average, can provide the same advantage.

Embodiment 3

Although the noise suppression device in accordance with above-mentioned Embodiment 1 is constructed in such a way that when the voice likelihood estimated value exceeds the threshold, the band representative component generating unit 6 selects a power spectrum having a maximum value within the same subband as the representative power spectrum, whereas when the voice likelihood estimated value is equal to or smaller than the threshold, the band representative component generating unit calculates the average of the plurality of power spectra within the same subband, and carries out switching control in such a way as to generate the representative power spectrum having this average value, the noise suppression device can use another method to generate the representative power spectrum. For example, as shown in the following equation (10), the noise suppression device can use the voice likelihood estimated value VAD as a weighting factor to define a weighting sum of the maximum and the average as the representative power spectrum.

$$Y_d(z) = VAD \cdot \left\{ \max\left[ Y(z,k) \Big|_{k=f_1(z)}^{k=f_2(z)} \right] \right\} + (1 - VAD) \cdot \left\{ \sum_{k=f_1(z)}^{f_2(z)} \frac{Y(z,k)}{(f_2(z) - f_1(z) + 1)} \right\} \tag{10}$$

In this equation (10), the weights respectively assigned to the maximum and the average can be changed continuously according to the voice likelihood estimated value VAD. Because the voice likelihood estimated value VAD becomes large when there is a high likelihood that the input signal is a voice, the weight assigned to the maximum becomes large in the representative power spectrum. In contrast, because the voice likelihood estimated value VAD becomes small when there is a high likelihood that the input signal is a noise, the weight assigned to the average becomes large in the representative power spectrum.

As mentioned above, the band representative component generating unit 6 according to this Embodiment 3 is constructed in such a way as to calculate the weighting sum of the maximum and the average of the plurality of power spectra within each subband by using the voice likelihood estimated value as the weighting factor, and define the weighting sum as the representative power spectrum. Therefore, when it is difficult to make a distinction between a voice component and a noise component, the noise suppression device can generate the representative power spectrum with stability and can therefore carry out a high-quality noise suppression.

Embodiment 4

Although in the noise suppression device according to above-mentioned Embodiment 1, the band representative component generating unit 6 carries out switching control for the generation of the representative power spectrum of each of all the subbands on the basis of the voice likelihood estimated value, the band representative component generating unit can carry out switching control for each subband. For example, when the band representative component generating unit 6 calculates a variance of the plurality of power spectra within each subband and the variance exceeds a predetermined threshold, the band representative component generating unit determines that the subband includes a voice component, and switches to a method of selecting a maximum as the representative power spectrum. In contrast, when the variance is equal to or smaller than the predetermined threshold, the band representative component generating unit switches to a method of calculating an average as the representative power spectrum.

The variance is a method for detecting variations in the values of the plurality of power spectra in each subband, and another analytical method can be alternatively used as long as it is a method of being able to detect variations in the values of the plurality of power spectra in each subband, instead of the variance.

As mentioned above, the band representative component generating unit 6 according to this Embodiment 4 is constructed in such a way as to switch between the methods of generating the representative power spectrum for each subband, the noise suppression device can further improve the accuracy of generation of the representative power spectrum and can therefore carry out a higher-quality noise suppression.

Although in any one of Embodiments 1 to 4 mentioned above, the maximum a posteriori method (the MAP method) is used as the method of suppressing a noise for use in the noise suppression amount generating unit 7, the present embodiment is not limited to this method, and another method can be applied to the noise suppression amount generating unit 7. For example, a minimum mean-square error short-time spectral amplitude estimator explained in detail in nonpatent reference 1, a spectral subtraction method explained in detail in "Suppression of Acoustic Noise in Speech Using Spectral Subtraction", S. F. Boll, (IEEE Trans. on ASSP, Vol. 27, No. 2, pp. 113-120, April 1979), or the like can be used.

Further, although in any one of Embodiments 1 to 4 mentioned above, the case in which the target for the noise suppression by the noise suppression device is a narrow band telephone (having a band ranging from 0 to 4,000 Hz) is shown as an example of the band division carried out by the band separating unit 5, as shown in FIG. 2, the target for the noise suppression by the noise suppression device is not limited to the narrow band telephone voice. For example, a wide band telephone voice or an acoustic signal having a band ranging from 0 to 8000 Hz can be the target for the noise suppression by the noise suppression device.

Further, in any one of Embodiments 1 to 4 mentioned above, the input signal $\hat{y}(t)$ on which a noise suppression has been carried out can be sent out in a digital data form to one of various sound acoustic processors including a voice to digital converter, a voice recognition device, a voice storage device, and a handsfree call device. The noise suppression device according to any one of Embodiments 1 to 4 can be implemented independently by a DSP (digital signal processor), or the noise suppression device, together with one of the above-mentioned devices, can be implemented by a DSP. The noise suppression device according to any one of Embodiments 1 to 4 can be alternatively implemented by a software program which executes the processing carried out by the noise suppression device. The software program can be stored in a storage unit of a computer which executes the software program, or can be distributed via a storage medium, such as a CD-ROM. As an alternative, the program can be provided via a network. Further, the input signal $\hat{y}(t)$ on which a noise suppression has been carried out can be D/A (digital to analog) converted by a unit placed behind the output terminal 11, can be amplified by an amplifying device, and can be outputted as a voice signal directly from a speaker or the like

INDUSTRIAL APPLICABILITY

As mentioned above, because the noise suppression device in accordance with the present invention is constructed in such a way as to carry out a high-quality noise suppression with a small amount of information to be processed, the noise suppression device in accordance with the present invention is suitable for provision of an improvement in the sound quality of equipment in which voice communications, a voice storage, and a voice recognition system are introduced, the equipment including a voice communication system, such as a car navigation, a mobile phone or an interphone, a handsfree call system, a television meeting system, a monitoring system, or the like, and provision of an improvement in the recognition rate of a voice recognition system.

The invention claimed is:

1. A noise suppression device including a time-to-frequency converting unit for converting an input signal on a time domain into power spectra and phase spectra which are signals on a frequency domain, a noise spectrum estimating unit for estimating a noise spectrum carried on said input signal, a noise suppression amount generating unit for calculating an amount of noise suppression by using said power spectra and said noise spectra, a noise suppressing unit for suppressing amplitudes of said power spectra according to said amount of noise suppression, and a frequency-to-time converting unit for converting said phase spectra and said power spectra whose amplitudes are suppressed by said noise suppressing unit into signals on a time domain, wherein said noise suppression device has a representative component generating unit for combining a plurality of power spectra into which said input signal is converted by said time-to-frequency converting unit into each group, and for selecting a power spectrum having a larger value from among said plurality of power spectra in said each group on a priority basis to define the power spectrum selected thereby as a representative power spectrum, and said noise suppression amount generating unit calculates the amount of noise suppression by using said representative power spectrum.

2. The noise suppression device according to claim 1, wherein said noise suppression device includes a voice likelihood estimating unit for calculating a voice likelihood estimated value showing a degree of likelihood that the input signal is a voice, and the representative component generating unit generates the representative power spectrum on a basis of said voice likelihood estimated value.

3. The noise suppression device according to claim 2, wherein the representative component generating unit selects a power spectrum having a larger value within each group on a priority basis to generate the representative power spectrum on a basis of the voice likelihood estimated value when the degree of likelihood that the input signal is a voice is high, whereas when the degree of likelihood that the input signal is a voice is low, the representative component generating unit acquires an average of the plurality of power spectra in said each group to generate the representative power spectrum.

4. The noise suppression device according to claim 1, wherein the representative power spectrum has a maximum among the plurality of power spectra in each group.

5. The noise suppression device according to claim 1, wherein the representative power spectrum is a weighting average which is acquired by respectively assigning weights to said plurality of power spectra in each group, and then averaging said plurality of power spectra respectively multiplied by said weights, the weights sequentially increasing with increase in the values of the power spectra.

6. The noise suppression device according to claim 2, wherein the representative power spectrum is a weighting sum of a maximum and an average of the plurality of power spectra in each group using the voice likelihood estimated value as a weighting factor.

7. The noise suppression device according to claim 1, wherein the representative component generating unit changes a method of generating the representative power spectrum for each group.

* * * * *